(12) United States Patent
Oonuma et al.

(10) Patent No.: US 9,796,804 B2
(45) Date of Patent: Oct. 24, 2017

(54) POLYMER AND PRODUCTION METHOD THEREOF, MOLDING MATERIAL AND MOLDED PRODUCT

(71) Applicant: Mitsubishi Rayon Co., Ltd., Chiyoda-ku (JP)

(72) Inventors: Taeko Oonuma, Otake (JP); Shingo Hikita, Otake (JP); Tetsuya Noda, Otake (JP); Masakazu Itou, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/652,512

(22) PCT Filed: Dec. 18, 2013

(86) PCT No.: PCT/JP2013/083932
§ 371 (c)(1),
(2) Date: Jun. 16, 2015

(87) PCT Pub. No.: WO2014/098141
PCT Pub. Date: Jun. 26, 2014

(65) Prior Publication Data
US 2016/0185893 A1    Jun. 30, 2016

(30) Foreign Application Priority Data

Dec. 18, 2012 (JP) ................. 2012-275438
Jul. 1, 2013 (JP) ................. 2013-138007

(51) Int. Cl.
C08F 293/00 (2006.01)
C08F 290/04 (2006.01)
C08F 2/20 (2006.01)
C08F 2/38 (2006.01)

(52) U.S. Cl.
CPC .............. *C08F 293/00* (2013.01); *C08F 2/20* (2013.01); *C08F 2/38* (2013.01); *C08F 290/046* (2013.01)

(58) Field of Classification Search
CPC .......... C08F 2/20; C08F 2/38; C08F 290/046; C08F 293/00
See application file for complete search history.

(56) References Cited

U.S. PATENT DOCUMENTS

| | | |
|---|---|---|
| 5,264,530 A | 11/1993 | Darmon et al. |
| 5,773,534 A | 6/1998 | Antonelli et al. |
| 2002/0054996 A1 | 5/2002 | Rheenen |
| 2002/0055587 A1 | 5/2002 | Lau et al. |
| 2002/0058752 A1 | 5/2002 | Lau et al. |
| 2004/0171732 A1 | 9/2004 | Matsuzaki et al. |
| 2010/0120974 A1 | 5/2010 | Shimanaka et al. |

FOREIGN PATENT DOCUMENTS

| | | |
|---|---|---|
| JP | 52-9087 A | 1/1977 |
| JP | 2000-355605 A | 12/2000 |
| JP | 2003-002934 A | 1/2003 |
| JP | 2004-509184 A | 3/2004 |
| JP | 2006-160995 A | 6/2006 |
| JP | 2007-023060 A | 2/2007 |
| JP | 2008-214530 A | 9/2008 |

OTHER PUBLICATIONS

Poly(2-ethylhexyl acrylate) data sheet obtained from http://polymerdatabase.com/polymers/poly2-ethylhexylacrylate.html on Jun. 15, 2016.*
Poly(methyl methacrylate) data sheet obtained from http://polymerdatabase.com/polymers/polymethylmethacrylate.html on Jun. 15, 2016.*
International Search Report (ISR) dated Mar. 18, 2014, for International application No. PCT/JP2013/083932.

* cited by examiner

*Primary Examiner* — Irina S Zemel
*Assistant Examiner* — Jeffrey Lenihan
(74) *Attorney, Agent, or Firm* — Morgan, Lewis & Bockius LLP

(57) ABSTRACT

A molded product with excellent transparency can be obtained by using a polymer (D) obtained by suspension polymerization of a monomer mixture (1) containing (a) to (c) below:
(a) 5-60 mass % of a specific macromonomer;
(b) 5-60 mass % of the raw material monomer of a homopolymer (B) that has a solubility parameter that is different by 0.25 or more from the solubility parameter of the macromonomer (a); and
(c) 10-80 mass % of the raw material monomer of a homopolymer (C) that has a solubility parameter that is different by less than 0.25 from the solubility parameter of macromonomer (a).

16 Claims, No Drawings

POLYMER AND PRODUCTION METHOD THEREOF, MOLDING MATERIAL AND MOLDED PRODUCT

TECHNICAL FIELD

The present invention relates to a polymer, a method for producing the same, a molding material, and a molded product.

BACKGROUND ART

As studies are made on synthesis of various monomers and polymers, various polymers are now widely used as a product material. Various characteristics of a polymer such as dynamic characteristics, optical characteristics, and chemical characteristics vary depending on the type of a polymer. When the polymer is industrially used, a homopolymer using one type of a monomer cannot satisfy diverse conditions that are required for a material. As such, a method of using a random copolymer in which many kinds of a monomer are used or a method of mixing heterogeneous polymers is employed. However, for a case in which a random copolymer is used, there is a tendency that characteristics of each copolymerized monomer unit are averaged. In addition, simple mixing of two or more types of a polymer yields separation of polymers that are not miscible with each other (referred to as macro phase separation), and thus it often leads to characteristics that are inferior to those of each monomer unit.

For solving the problems above, known is a block copolymer in which two or more polymer segments are chemically bonded to each other. Since phase separation occurs as polymers are not easily miscible with each other, the phase separation structure has a size of nanometer (referred to as micro phase separation) as they are connected to each other via a chemical bond. For such reasons, characteristics of each polymer segment can be exhibited without inhibiting the characteristics of each polymer segment.

Among the block copolymers, a (meth)acryl block copolymer is being applied for various uses which require transparency or weather resistance.

As a method for producing a (meth)acryl block copolymer, the following method is known (for example, Patent Document 1). First, a macromonomer is produced in advance by using a cobalt chain transfer agent having a very high chain transfer constant. Subsequently, the obtained macromonomer is copolymerized with other (meth)acryl monomer in a solution. However, since this block copolymer is produced by solution polymerization, a recovery process such as re-precipitation is required when the obtained polymer solution is used for an application other than a coating material while the polymer solution can be directly used for use as a coating material. In this regard, from the viewpoint of using a solvent, environmental load is large.

CITATION LIST

Patent Document

Patent Document 1: JP 2000-355605 A

DISCLOSURE OF THE INVENTION

Problem to be Solved by the Invention

As a production method having less environmental load and allowing easier recovery of a polymer than solution polymerization, suspension polymerization is known. However, in a case in which a monomer which has polarity different from a macromonomer is copolymerized by suspension polymerization, a problem of having a cloudy molded product occurs when the obtained polymer is used for molding.

For example, when suspension copolymerization between a macromonomer of methyl methacrylate and butyl acrylate is tried, polybutyl acrylate is produced in a large amount, and it is believed that not only a copolymer between a macromonomer of methyl methacrylate and butyl acrylate but also a homopolymer of butyl acrylate is present in the obtained polymerized product, yielding macro phase separation. It was also found that the optical characteristics that are obtained by solution polymerization are not yielded therefrom.

An object of the present invention is to provide a polymer with excellent transparency that is obtained by suspension polymerization by using a monomer mixture containing a macromonomer and a monomer which has polarity different from the macromonomer, a method for producing the same, a molding material containing the polymer, and a molded product obtained from the molding material.

Means for Solving Problem

The above problems are solved by the following [1] to [15] of the present invention.

[1] A polymer (D) obtained by suspension polymerization of a monomer mixture (1) containing (a) to (c) below:
(a) 5 to 60% by mass of a macromonomer represented by General Formula (1) below;

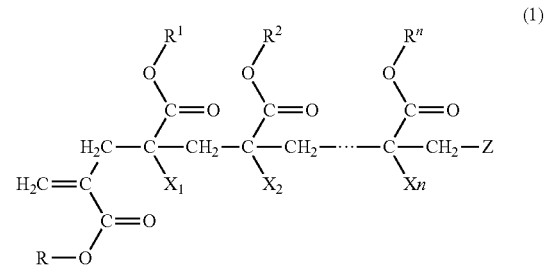

(wherein, R and $R^1$ to $R^n$ each independently represent a hydrogen atom, an alkyl group, a cycloalkyl group, an aryl group, or a heterocyclic group,
$X_1$ to $X_n$ each independently represent a hydrogen atom or a methyl group,
Z represents a terminal group, and
n is a natural number of 2 to 10,000)
(b) 5 to 60% by mass of a raw material monomer of a homopolymer (B) that is obtained by polymerization of a raw material monomer and has a solubility parameter which is different by 0.25 or more from the solubility parameter of the macromonomer (a), and
(c) 10 to 80% by mass of a raw material monomer of a homopolymer (C) that is obtained by polymerization of a raw material monomer and has a solubility parameter which is different by less than 0.25 from the solubility parameter of the macromonomer (a).
[2] The polymer (D) described in [1], in which a weight average molecular weight (hereinbelow, referred to as "Mw") is 100,000 or more.

[3] The polymer (D) described in [1] or [2], in which the monomer for obtaining the macromonomer (a) is methacrylic acid ester, the raw material monomer (b) is acrylic acid ester, and the raw material monomer (c) is methacrylic acid ester.

[4] The polymer (D) described in [1] or [2], in which the monomer for obtaining the macromonomer (a) is a monomer composition containing methacrylic acid ester and acrylic acid ester, the raw material monomer (b) is acrylic acid ester, and the raw material monomer (c) is methacrylic acid ester.

[5] The polymer (D) described in [1] or [2], in which the monomer for obtaining the macromonomer (a) is a monomer composition containing methyl methacrylate and methyl acrylate, the raw material monomer (b) is butyl acrylate, and the raw material monomer (c) is methyl methacrylate.

[6] The polymer (D) described in any one of [1] to [4], in which the raw material monomer (b) is acrylic acid ester having an ester group with 1 to 10 carbon atoms.

[7] A method for producing a polymer (D) by suspension polymerization of the monomer mixture (1-I) containing the following (a-I) to (c-I):

(a-I) 15 to 60% by mass of a macromonomer represented by General Formula (1) below;

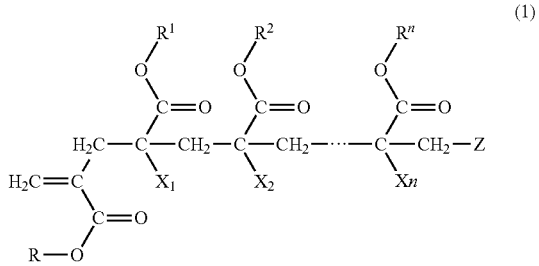

(wherein, R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n is a natural number of 2 to 10,000)

(b-I) 5 to 60% by mass of acrylic acid ester, and (c-I) 10 to 80% by mass of methacrylic acid ester.

[8] The method for producing a polymer (D) described in [7], in which the macromonomer (a-I) contains a methyl methacrylate unit and a methyl acrylate unit, the acrylic acid ester (b-I) is butyl acrylate, and the methacrylate ester (c-I) is methyl methacrylate.

[9] A method for producing a polymer (D) by suspension polymerization of a syrup dispersion in which a monomer solution having the following macromonomer (a) dissolved in a monomer mixture (2), which contains the raw material monomer (b) and the raw material monomer (c) below, is dispersed in water:

(a) 15 to 60% by mass of a macromonomer represented by General Formula (1) below;

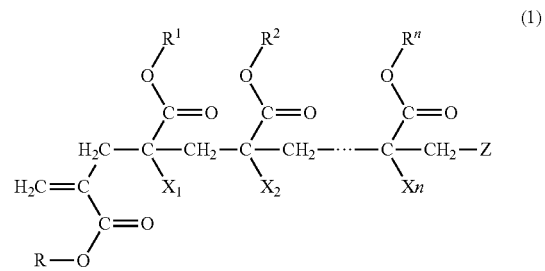

(wherein, R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n is a natural number of 2 to 10,000)

(b) 5 to 60% by mass of a raw material monomer of a homopolymer (B) that is obtained by polymerization of a raw material monomer and has a solubility parameter which is different by 0.25 or more from the solubility parameter of the macromonomer (a), and (c) 10 to 80% by mass of a raw material monomer of a homopolymer (C) that is obtained by polymerization of a raw material monomer and has a solubility parameter which is different by less than 0.25 from the solubility parameter of the macromonomer (a).

[10] The method for producing a polymer (D) described in [9], in which the syrup dispersion is obtained by dissolving the macromonomer (a) in the monomer mixture (2) containing the raw material monomer (b) and the raw material monomer (c), adding a radical polymerization initiator, and then adding a dispersion agent and a dispersion medium.

[11] The method for producing a polymer (D) described in [9], in which the syrup dispersion is obtained by adding the monomer mixture (2) containing the raw material monomer (b) and the raw material monomer (c) to an aqueous suspension containing particulate products of the macromonomer (a).

[12] A molding material containing the polymer (D) that is described in any one of [1] to [6].

[13] A molding material containing the polymer (D) that is obtained by the method described in any one of [7] to [11].

[14] A molded product obtained from the molding material described in [12].

[15] A molded product obtained from the molding material described in [13].

Effect of the Invention

According to the present invention, a monomer mixture containing the macromonomer (a) and a monomer having the polarity different from the macromonomer (a) is used and production can be made by suspension polymerization. As such, a polymer with excellent transparency can be obtained in a state with less environmental load.

MODE(S) FOR CARRYING OUT THE INVENTION

[Macromonomer (a)]

The macromonomer (a) is represented by General Formula (1) above.

Namely, the macromonomer (a) indicates a poly(meth) acrylic acid ester segment in which a group having a radical polymerizable unsaturated double bond is added to a single end. As described herein, the macromonomer indicates a polymer which has a polymerizable functional group, and it is also referred to as a macromer. Meanwhile, in the present invention, "(meth)acrylic acid" represents either "acrylic acid" or "methacrylic acid."

In General Formula (1), R and $R^1$ to $R''$ each independently represent a hydrogen atom, an alkyl group, a cycloalkyl group, an aryl group, or a heterocyclic group. An alkyl group, a cycloalkyl group, an aryl group, or a heterocyclic group may have a substituent group.

Examples of the alkyl group for R or $R^1$ to $R''$ include a branched or linear alkyl group with 1 to 20 carbon atoms. Specific examples of the alkyl group for R or $R^1$ to $R''$ include a methyl group, an ethyl group, an n-propyl group, and an i-propyl group.

Examples of the cycloalkyl group for R or $R^1$ to $R''$ include a branched or linear alkyl group with 3 to 20 carbon atoms. Specific examples of the alkyl group for R or $R^1$ to $R''$ include a cyclopropyl group, a cyclobutyl group, and an adamantyl group.

Examples of the aryl group for R or $R^1$ to $R''$ include an aryl group with 6 to 18 carbon atoms. Specific examples of the aryl group for R or $R^1$ to $R''$ include a phenyl group and a naphthyl group.

Examples of the heterocyclic group for R or $R^1$ to $R''$ include a heterocyclic group with 5 to 18 carbon atoms. Specific examples of the aryl group for R or $R^1$ to $R''$ include a lactone ring such as γ-lactone group and a ε-caprolactone group.

Examples of the substituent group for R or $R^1$ to $R''$ include, each independently, a group selected from a group consisting of an alkyl group, an aryl group, a carboxy group, an alkoxycarbonyl group (—COOR'), a carbamoyl group (—CONR'R''), a cyano group, a hydroxy group, an amino group, an amide group (—NR'R''), halogen, an allyl group, an epoxy group, an alkoxy group (—OR') and a hydrophilic or ionic group, or an atom. Meanwhile, examples of R' or R'' include, each independently, the same group as R except a heterocyclic group.

Examples of the alkoxycarbonyl group as a substituent group for R or $R^1$ to $R''$ include a group having an alkoxy group with 1 to 12 carbon atoms, for example, a methoxycarbonyl group.

Examples of the carbamoyl group as a substituent group for R or $R^1$ to $R''$ include an N-mono($C_{1-20}$alkyl) a carbamoyl group and a N,N-di($C_{1-20}$alkyl)carbamoyl group, and specifically an N-methyl carbamoyl group and N,N-dimethyl carbamoyl group, for example.

Examples of the amide group as a substituent group for R or $R^1$ to $R''$ include an N-mono($C_{1-20}$alkyl)amide group and a N,N-di($C_{1-20}$alkyl)amide group, and specifically a dimethylamide group.

Examples of the halogen as a substituent group for R or $R^1$ to $R''$ include fluorine, chlorine, bromine, and iodine.

Examples of the alkoxy group as a substituent group for R or $R^1$ to $R''$ include an alkoxy group with 1 to 12 carbon atoms, and specifically a methoxy group.

Examples of the hydrophilic or ionic group as a substituent group for R or $R^1$ to $R''$ include a cationic substituent group such as an alkali salt of carboxy group, an alkali salt of sulfoxy group, a poly(alkylene oxide) group such as polyethylene oxide group or polypropylene oxide group, and a quaternary ammonium group.

As for the R and $R^1$ to $R''$, at least one selected from an alkyl group and a cycloalkyl group is preferable, and an alkyl group is more preferable. As for the alkyl group, a methyl group, an ethyl group, an n-propyl group, or an i-propyl group is preferable. From the viewpoint of easy availability, a methyl group is more preferable.

$X_1$ to $X_n$ is at least one selected from a hydrogen atom and a methyl group, and a methyl group is preferable.

As for the $X_1$ to $X_n$, at least half of the $X_1$ to $X_n$ are preferably a methyl group from the viewpoint of easy synthesis of the macromonomer (a).

Z is an end group of the macromonomer (a). Examples of the end group of the macromonomer (a) include, similar to the end group of a polymer which is obtained by known radical polymerization, a hydrogen atom and a group derived from a radical polymerization initiator. Examples of the group derived from a radical polymerization initiator include a 1,1,3,3-tetramethylbutyl group, a cyanopropyl group and a 2-methylpropionitrile group.

n is a natural number of 2 to 10,000.

Examples of the monomer for obtaining the macromonomer (a) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth)acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, (meth) acrylic acid polyethylene glycol, (meth)acrylic acid polypropylene glycol, methoxyethyl (meth)acrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonyl phenoxyethyl (meth)acrylate, 3-methoxybutyl (meth)acrylate, PLACCEL FM (product name, manufactured by Daicel Corporation, monomer added with caprolactone), BLEMMER PME-100 (product name, manufactured by NOF CORPORATION, methoxypolyethylene glycol methacrylate (two consecutive chains of ethylene glycol)), BLEMMER PME-200 (product name, manufactured by NOF CORPORATION, methoxypolyethylene glycol methacrylate (four consecutive chains of ethylene glycol)), BLEMMER PME-400 (product name, manufactured by NOF CORPORATION, methoxypolyethylene glycol methacrylate (nine consecutive chains of ethylene glycol)), BLEMMER 50POEP-800B (product name, manufactured by NOF CORPORATION, octoxypolyethylene glycol-polypropylene glycol-methacrylate (eight consecutive chains of ethylene glycol and six consecutive chains of propylene glycol)), and BLEMMER 20ANEP-600 (product name, manufactured by NOF CORPORATION, nonyl phenoxy(ethylene glycol-polypropylene glycol)monoacrylate), BLEMMER AME-100 (product name, manufactured by NOF CORPORATION), BLEMMER AME-200 (product name, manufactured by NOF CORPORATION) and BLEMMER 50AOEP-800B (product name, manufactured by NOF CORPORATION).

Among them, from the easy availability of a monomer, methacrylic acid ester is preferable.

As for the methacrylic acid ester, methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, and 4-hydroxybutyl methacrylate are preferable, and methyl methacrylate, n-butyl methacrylate and 2-ethylhexyl methacrylate are more preferable.

Furthermore, as a monomer for obtaining the macromonomer (a), from the viewpoint of the heat resistance of the polymer (D) to be obtained, a monomer composition containing methacrylic acid ester and acrylic acid ester is preferable.

Examples of the acrylic acid ester include methyl acrylate, ethyl acrylate, n-propyl acrylate, isopropyl acrylate, n-butyl acrylate, isobutyl acrylate and t-butyl acrylate. Among them, from the easy availability, methyl acrylate is preferable.

The content of methacrylic acid ester in the monomer composition is, from the viewpoint of the heat resistance of the polymer (D) and the molded product, preferably 80% by mass or more and 99.5% by mass or less. The lower limit of the content of methacrylic acid ester is more preferably 82% by mass or more and even more preferably 84% by mass or more. The upper limit of the content of methacrylic acid ester is more preferably 99% by mass or less and even more preferably 98% by mass or less.

According to the present invention, an unsaturated carboxylic acid unit such as (meth)acrylic acid may be contained as a monomer unit of the macromonomer (a) depending on purpose.

Examples of the unsaturated carboxylic acid include (meth)acrylic acid, maleic acid, and maleic anhydride.

As for the monomer for obtaining the macromonomer (a), the aforementioned monomer may be used either singly or in combination of two or more types.

Mw of the macromonomer (a) is preferably 3,000 or more and 1,000,000 or less from the viewpoint of mechanical and physical properties of the molded product of the present invention. The lower limit of the Mw of the macromonomer (a) is more preferably 5,000 or more and even more preferably 15,000 or more. Furthermore, the upper limit of the Mw of the macromonomer (a) is more preferably 500,000 or less and even more preferably 300,000 or less.

The macromonomer (a) may be used either singly or in combination of two or more types.

The macromonomer (a) can be prepared by a known method. Examples of a method for preparing a macromonomer include a production method which uses a cobalt chain transfer agent (specification of U.S. Pat. No. 4,680,352), a method of using an a substituted unsaturated compound such as α-bromomethyl styrene as a chain transfer agent (WO 88/04,304 A), a method for chemical binding of a polymerizable group (JP 60-133007 A and specification of U.S. Pat. No. 5,147,952), and a thermal degradation method (JP 11-240854 A).

Among them, from the viewpoint of having few production steps and using catalyst with a high chain transfer constant, a production method using a cobalt chain transfer agent is preferred as a method for producing the macromonomer (a).

Examples of the method for producing the macromonomer (a) by using a cobalt chain transfer agent include bulk polymerization, solution polymerization and aqueous dispersion polymerization. Examples of the aqueous dispersion polymerization include suspension polymerization and emulsion polymerization.

Among them, from the viewpoint of having a simplified recovery step for the macromonomer (a), aqueous dispersion polymerization is preferable. For the aqueous dispersion polymerization, only water or a mixture of water and a water soluble solvent (for example, ethanol) may be used as a solvent.

Examples of the solvent which is used for obtaining the macromonomer (a) by solution polymerization include hydrocarbons such as toluene; ethers such as diethyl ether or tetrahydrofuran; halogenated hydrocarbons such as dichloromethane or chloroform; ketones such as acetone; alcohols such as methanol; nitriles such as acetonitrile; vinyl esters such as ethyl acetate; carbonates such as ethylene carbonate; and super critical carbon dioxide. They may be used either singly or in combination of two or more types.

For producing the polymer (D) described below, a power product or particulate product obtained by recovery•purification of the synthesized macromonomer (a) may be used, or a suspension of the macromonomer (a) which has been synthesized by suspension polymerization may be used directly.

The particulate product of the macromonomer (a) has an average particle diameter of 20 to 400 μm, for example. It is preferably 50 to 200 μm or so.

<Raw Material Monomer (b)>

The raw material monomer (b) indicates, in the case of homopolymerization, a monomer which enables obtainment of the homopolymer (B) that has a solubility parameter which is different by 0.25 or more from the solubility parameter of the macromonomer (a). Namely, a difference between the solubility parameter of the homopolymer (B) which is obtained from the raw material monomer (b) and the solubility parameter of the macromonomer (a) is 0.25 or more. It is preferably 0.30 or more. Furthermore, the difference between the solubility parameter of the homopolymer (B) which is obtained from the raw material monomer (b) and the solubility parameter of the macromonomer (a) is generally 8 or less.

In the present invention, the solubility parameter indicates a value obtained by Fedor method. The solubility parameter is an indicator of affinity between materials, and materials having small difference in solubility parameter have an easily miscible property.

The solubility parameter (SP) value can be calculated by the following Formula (2).

$$SP=(\Delta H/V)^{1/2} \qquad (2)$$

In Formula (2), ΔH represents molar vaporization enthalpy (J/mol) and V represents molar volume (cm³/mol). Further, as for the ΔH and V, sum (ΔH) of the molar vaporization enthalpy (Δei) and sum (V) of the molar volume (Δvi) of the atomic group described in "POLYMER ENGINEERING AND SCIENCE, February, 1974, Vol. 14, No. 2, Robert F. Fedors (page 147 to 154)" were used. Meanwhile, the solubility parameter of a copolymer was calculated based on molar ratio of the monomer composition of a copolymer.

Examples of the raw material monomer (b) include the same monomer as those exemplified for obtaining the macromonomer (a).

When it is desired to provide the polymer (D) of the present invention with flexibility, examples of the raw material monomer (b) which can be used include acrylic acid ester having an ester group with 1 to 20 carbon atoms and methacrylic acid ester having an ester group with 4 to 20 carbon atoms. Among them, acrylic acid ester having an ester group with 1 to 10 carbon atoms is preferable. More preferably, it is acrylic acid ester having a branched or linear alkyl ester group with 1 to 10 carbon atoms. The branched or linear alkyl with 1 to 10 carbon atoms may be also substituted with a hydroxyl group. Among the acrylic acid esters, methyl acrylate, ethyl acrylate, n-propyl acrylate, n-butyl acrylate, 2-ethylhexyl acrylate, 2-hydroxyethyl acrylate and 4-hydroxybutyl acrylate are more preferable.

Hereinbelow, specific examples of the raw material monomer (b) according to the type of the macromonomer (a) are described below.

When polymethyl methacrylate (PMMA) is used as the macromonomer (a), specific examples of the raw material monomer (b) include n-butyl acrylate (nBA).

When poly(butyl acrylate) (PBA) is used as the macromonomer (a), specific examples of the raw material monomer (b) include methyl methacrylate (MMA).

When poly(butyl methacrylate) (PBMA) is used as the macromonomer (a), specific examples of the raw material monomer (b) include methyl acrylate (MA).

Furthermore, when a copolymer of MMA and MA (MMA/MA=90% by mass/10% by mass) is used as the macromonomer (a), specific examples of the raw material monomer (b) include nBA.

The raw material monomer (b) may be used either singly or in combination of two or more types.

<Raw Material Monomer (c)>

The raw material monomer (c) indicates, in the case of homopolymerization, a monomer which enables obtainment of the homopolymer (C) that has a solubility parameter which is different by less than 0.25 from the solubility parameter of the macromonomer (a). Namely, a difference between the solubility parameter of the homopolymer (C) which is obtained from the raw material monomer (c) and the solubility parameter of the macromonomer (a) is by less than 0.25 but 0 or more.

Examples of the raw material monomer (c) include, among the same monomers as the monomer for obtaining the macromonomer (a), those showing a solubility parameter difference of less than 0.25 between the homopolymer (C) of the raw material monomer (c) and the macromonomer (a). Preferably, the difference is less than 0.20.

Among them, from the viewpoint of transparency of the polymer (D), (meth)acrylic acid ester is preferable. Furthermore, in particular, methyl (meth)acrylate, ethyl (meth)acrylate, n-propyl (meth)acrylate, n-butyl (meth)acrylate, lauryl methacrylate, dodecyl methacrylate, stearyl methacrylate, 2-ethylhexyl (meth)acrylate, glycidyl methacrylate, 2-hydroxyethyl (meth)acrylate and 4-hydroxybutyl (meth)acrylate are more preferable. Furthermore, among them, methyl methacrylate, ethyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate and 4-hydroxybutyl methacrylate are even more preferable.

Hereinbelow, specific examples of the raw material monomer (c) according to the type of the macromonomer (a) are described below.

When poly(methyl methacrylate) (PMMA) is used as the macromonomer (a), specific examples of the raw material monomer (c) include methyl methacrylate (MMA).

When poly(butyl acrylate) (PBA) is used as the macromonomer (a), specific examples of the raw material monomer (c) include n-butyl acrylate (nBA).

When poly(butyl methacrylate) (PBMA) is used as the macromonomer (a), specific examples of the raw material monomer (c) include n-butyl methacrylate (nBMA).

The raw material monomer (c) may be used either singly or in combination of two or more types.

Furthermore, when a copolymer of MMA and MA (MMA/MA=90% by mass/10% by mass) is used as the macromonomer (a), specific examples of the raw material monomer (c) include MMA.

<Monomer Mixture (1)>

The monomer mixture (1) contains the macromonomer (a) at 15 to 60% by mass, the raw material monomer (b) at 5 to 60% by mass and the raw material monomer (c) at 10 to 80% by mass.

As the content of the macromonomer (a) is 15% by mass or more and 60% by mass or less in the monomer mixture (1), favorable mechanical strength and transparency of the molded product of the present invention can be obtained. The lower limit of the content of the macromonomer (a) in the monomer mixture (1) is preferably 20% by mass or more. Furthermore, the upper limit of the content of the macromonomer (a) in the monomer mixture (1) is preferably 55% by mass or less. From the viewpoint of having favorable heat resistance of the polymer (D) and molded product of the present invention, the content of the macromonomer (a) is more preferably 20% by mass or more and 50% by mass or less in the monomer mixture (1). The content of the macromonomer (a) in the monomer mixture (1) is more preferably 25% by mass or more and 45% by mass or less from the viewpoint of dispersion stability during suspension polymerization.

As the content of the raw material monomer (b) is 5% by mass or more and 60% by mass or less in the monomer mixture (1), favorable flexibility of the molded product of the present invention can be obtained.

The lower limit of the content of the macromonomer (b) in the monomer mixture (1) is preferably 7% by mass or more. Furthermore, the upper limit of the content of the macromonomer (b) in the monomer mixture (1) is preferably 50% by mass or less.

As the content of the raw material monomer (C) is 10% by mass or more and 80% by mass or less in the monomer mixture (1), favorable transparency of the molded product of the present invention can be obtained. The lower limit of the content of the macromonomer (c) in the monomer mixture (1) is preferably 12% by mass or more. Furthermore, the upper limit of the content of the macromonomer (c) in the monomer mixture (1) is preferably 78% by mass or less.

Examples of the state of the monomer mixture (1) include a syrup in which the macromonomer (a) is dissolved in the raw material monomer (b) and the raw material monomer (c).

A mixture containing the following (a-I) to (c-I) is referred to as the monomer mixture (1-I):

(a-I) 15 to 60% by mass of a macromonomer represented by General Formula (1) below;

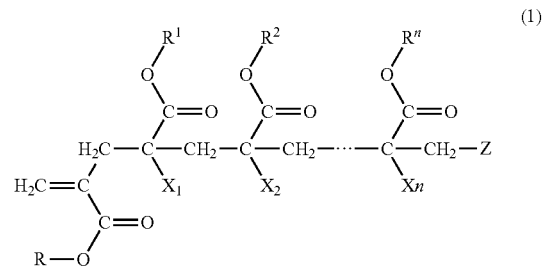

(wherein, R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and
n is a natural number of 2 to 10,000)
(b-I) 5 to 60% by mass of acrylic acid ester, and
(c-I) 10 to 80% by mass of methacrylic acid ester.

The above the macromonomer (a-I) preferably contains a methyl methacrylate unit and a methyl acrylate unit.

Furthermore, the acrylic acid ester (b-I) is preferably butyl acrylate.

Furthermore, the methacrylic acid ester (c-I) is methyl methacrylate.

<Monomer Mixture (2)>

The monomer mixture (2) is a monomer mixture containing the raw material monomer (b) and the raw material monomer (c), that is, the monomer mixture (1) except the macromonomer (a).

A monomer mixture containing the raw material monomer (b-I) and the raw material monomer (c-I), that is, the monomer mixture (1-I) except the macromonomer (a-I), is referred to as the monomer mixture (2-I).

<Polymer (D)>

The polymer (D) is a polymer which is obtained by suspension polymerization of the monomer mixture (1).

According to the present invention, the polymer (D) contains at least one selected from a polymer having only the unit of the macromonomer (a), the homopolymer (B) obtained by polymerization of the raw material monomer (b), the homopolymer (C) obtained by polymerization of the raw material monomer (c), a copolymer having the raw material monomer (b) and the raw material monomer (c), unreacted raw material monomer (a), unreacted raw material monomer (b), and unreacted raw material monomer (c).

The polymer (D) contains at least one selected from a block polymer having the unit of the macromonomer (a), the unit of the raw material monomer (b), and the unit of the raw material monomer (c), and a graft copolymer of the raw material monomer (b) and the raw material monomer (c) having the unit of the macromonomer (a) in a side chain.

Mw of the polymer (D) is preferably 30,000 or more and 5,000,000 or less from the viewpoint of mechanical strength and stability against heat of the polymer (D). The lower limit of the Mw of the polymer (D) is more preferably 100,000 or more. Furthermore, the upper limit of the Mw of the polymer (D) is more preferably 1,000,000 or less.

As the polymer (D) can be obtained by polymerization which does not use a metal catalyst or the like, it is preferred as a molded product and also as a molding material for obtaining a molded product having excellent transparency.

<Production of Polymer (D)>

Examples of the method for producing the polymer (D) include [1] a method in which a syrup dispersion, which is obtained by dissolving the macromonomer (a) in the monomer mixture (2), adding a radical polymerization initiator, and dispersing it in an aqueous solution in which a dispersion agent is dissolved, is subjected to suspension polymerization, and [2] a method in which a syrup dispersion, in which dispersion product of the monomer mixture (2) with the macromonomer (a) dissolved therein is obtained by adding the monomer mixture (2) to an aqueous suspension containing particulate products of the macromonomer (a) or to an aqueous suspension obtained by suspension polymerization of the macromonomer (a), is obtained and subjected to suspension polymerization.

Regarding the above methods, the polymer (D) obtained by the production method [1] tends to provide excellent optical characteristics. Furthermore, according to the production method [2], a step for recovering the macromonomer (a) can be omitted so that the production steps can be reduced.

In any one of the above methods, it is preferable to raise the temperature when the macromonomer (a) is dissolved in the monomer mixture (2).

The heating temperature for dissolving the macromonomer (a) in the monomer mixture (2) is preferably 30 to 90° C. When the heating temperature is 30° C. or higher, the solubility of the macromonomer (a) tends to be improved, and when the heating temperature is 90° C. or lower, volatilization of the monomer mixture (2) tends to get suppressed. The lower limit of the heating temperature is more preferably 35° C. or higher. Furthermore, the upper limit of the heating temperature is more preferably 75° C. or lower.

When the monomer mixture (2) in which the macromonomer (a) is dissolved is polymerized with use of a radical polymerization initiator, the time point for adding a radical polymerization initiator is preferably after dissolving the macromonomer (a) in the monomer mixture (2).

The temperature at the addition of a radical polymerization initiator is preferably 0° C. to (10 hour half life temperature of radical polymerization initiator—15° C.). When the temperature at the time of adding a radical polymerization initiator is 0° C. or higher, solubility of the radical polymerization initiator in the monomer tends to get improved. Furthermore, when the temperature at the time adding a radical polymerization initiator is (10 hour half life temperature of radical polymerization initiator—15° C.), there is a tendency of having stable polymerization.

Examples of the radical polymerization initiator include organic peroxides and an azo compound.

Specific examples of the organic peroxide include 2,4-dichlorobenzoyl peroxide, t-butylperoxypivalate, o-methyl benzoyl peroxide, bis-3,5,5-trimethylhexanoyl peroxide, octanoyl peroxide, t-butylperoxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butylhydroperoxide and di-t-butyl peroxide.

Specific examples of the azo compound include 2,2'-azobisisobutyronitrile, 2,2'-azobis(2-methyl butyronitrile), 2,2'-azobis(2,4-dimethylvaleronitrile) and 2,2'-azobis(2,4-dimethyl-4-methoxyvaleronitrile).

Among the above radical polymerization initiators, from the viewpoint of easy availability, benzoyl peroxide, 2,2'-azobisisobutyronitrile, 2,2'-azobis(2-methylbutyronitrile), 2,2'-azobis(2,4-dimethylvaleronitrile) and 2,2'-azobis(2,4-dimethyl-4-methoxyvaleronitrile) are preferable.

The radical polymerization initiator can be used either singly or in combination of two or more types.

The addition amount of the radical polymerization initiator is, from the viewpoint of controlling polymerization heat, preferably 0.0001 part by mass or more and 10 parts by mass or less relative to 100 parts by mass of the total amount of the macromonomer (a), the raw material monomer (b) and the raw material monomer (c).

The polymerization temperature for suspension polymerization is not particularly limited, and it is generally 50 to 120° C.

Examples of the dispersion agent which is used for suspension polymerization include alkali metal salt of poly (meth)acrylic acid, a copolymer of alkali metal salt of (meth)acrylic acid and (meth)acrylic acid ester, a copolymer of alkali metal salt of sulfoalkyl (meth)acrylate and (meth) acrylic acid ester, alkali metal salt of polystyrene sulfonic acid, a copolymer of alkali metal salt of styrene sulfonic acid and (meth)acrylic acid ester, or a copolymer obtained from a combination of those monomers; polyvinyl alcohol with saponification degree of 70 to 100%, methyl cellulose, starch, and hydroxyapatite. It may be used either singly or in combination of two or more types. Among them, a copolymer of alkali metal salt of sulfoalkyl (meth)acrylate and (meth)acrylic acid ester and a copolymer of alkali metal salt of sulfoalkyl (meth)acrylate and (meth)acrylic acid ester having good dispersion stability during suspension polymerization are preferable.

The content of the dispersion agent is 0.005 to 0.05% by mass in an aqueous suspension.

Examples of the dispersion medium used for suspension polymerization include water and alcohols.

In the present invention, for the purpose of improving dispersion stability of an aqueous suspension, an electrolyte such as sodium carbonate, sodium sulfate, and manganese sulfate can be added to an aqueous suspension.

In the present invention, a polymer can be obtained by polymerizing a raw material composition which contains a sulfur-containing chain transfer agent described below in a monomer mixture.

For the suspension polymerization, a chain transfer agent may be used depending on purpose.

Examples of the chain transfer agent include mercaptan, a-methylstyrene dimer and terpenoid.

<Molding Material>

The molding material of the present invention contains the polymer (D).

Form of the molding material of the present invention can be a solid or a liquid. When the molding material of the present invention is a solid, examples of the shape include a pellet, beads, and powder. When the molding material of the present invention is a liquid, examples of the form include a polymer solution in which the polymer (D) is dissolved in a solvent and a polymer solution in which the polymer (D) is dissolved in a radical polymerizable monomer to become a raw material of other polymers.

Examples of the solvent include the same solvent as those used for obtaining the macromonomer (a) by solution polymerization.

The polymer (D) contained in the molding material of the present invention may be used either singly or in combination of two or more types.

To the molding material of the present invention, other polymers different from the polymer (D) may be added, if necessary.

Examples of other polymers include an acryl polymer such as polymethyl methacrylate; polyolefin; polyamide; unsaturated polyester; saturated polyester such as polyethylene terephthalate or polybutylene terephthalate; and polycarbonate.

Examples of the method for mixing the polymer (D) with other polymers include a physical mixing method using a Henschel mixer or a blender, and a melt mixing method using an extruder or the like.

The molding material of the present invention may be blended with, if necessary, various stabilizing agents such as an anti-oxidant, an UV absorbing agent, and a heat stability agent; coloring agents such as an inorganic pigment, an organic pigment, and a dye; conductivity imparting agents such as carbon black and ferrite; and various additives such as an inorganic filler, a lubricant, a plasticizer, organic peroxide, a neutralizing agent, and a cross-linking agent.

<Molded Product>

The molded product of the present invention is obtained from the molding material of the present invention.

Examples of the shape of the molded product of the present invention include a three-dimensional shape such as a sheet shape and a film shape.

Examples of the molding method for obtaining the molded product of the present invention include injection molding, compression molding, hollow molding, extrusion molding, rotary molding, flow casting, and solvent casting.

EXAMPLES

Hereinbelow, the present invention is described in view of Examples. Meanwhile, as described below, "parts" indicates "parts by mass". Furthermore, weight average molecular weight (Mw), number average molecular weight (Mn), composition, structure, average particle diameter, and thermal decomposition temperature of a polymer, and haze and yellowness (YI) of a molded product were evaluated by the following methods.

(Method for Evaluation of Polymer)

(1) Mw and Mn

The Mw and Mn were measured under the following conditions by using the gel permeation chromatography (GPC) (product name: HLC-8220, manufactured by TOSOH CORPORATION).
Column: TSK GUARD COLUMN SUPER HZ-L (4.6×35 mm) and two TSK-GEL SUPER HZM-N (6.0×150 mm) were connected in series.
Eluent: Chloroform
Measurement temperature: 40° C.
Flow rate: 0.6 mL/minute It should be noted that a calibration curve was prepared by using polymethyl methacrylate manufactured by Polymer Laboratories (four kinds of Mp (peak top molecular weight) 141,500, 55,600, 10,290 or 1,590), and the Mw and Mn were obtained by using the calibration curve.

(2) Composition and Structure

The polymer was dissolved in chloroform, and the composition and structure of the polymer were analyzed by $^1$H-NMR measurement which uses a nuclear magnetic resonance apparatus (NMR) (product name: JNM-EX270 manufactured by JEOL Ltd.).

(3) Average Particle Diameter

Eight kinds of a sieve with a sieve opening of 3,300 μm, 2,000 μm, 1,000 μm, 500 μm, 300 μm, 212 μm, 106 μm or 63 μm were stacked in the order, that is, from a sieve with small sieve opening to a sieve with large sieve opening, on a tray dish to prepare a sieving apparatus.

Subsequently, 20 g of a bead-like polymer was applied on top of the uppermost sieve. After operating the sieving apparatus for 10 minutes with vibration, the mass of the bead-like polymer remained on each sieve was measured and mass percentage was obtained for each sieve. Based on the mass percentage measured for each sieve, the particle size distribution curve of the polymer was prepared. The particle diameter at accumulation of 50% by mass was used as the average particle diameter of the polymer.

(4) Thermal Decomposition Temperature

The thermal decomposition temperature was measured on the basis of JIS K7120 by using Thermo Gravimetry Differential Thermal Analyzer (TG/DTA) (product name: TG/DTA 6300, manufactured by Seiko Instruments Inc.). The injection gas was nitrogen. Subsequently, by using the obtained thermo gravimetry value, a thermos gravimetric curve (TG curve) was established. From the established TG curve, the temperature corresponding to 5% mass reduction was designated as Td5 and the temperature corresponding to 10% mass reduction was designated as Td10.

(Method for Evaluation of Molded Product)

(1) Haze

Haze of a molded product was measured on the basis of JIS K7136.

(2) Yellowness (YI)

YI of a molded product was measured on the basis of JIS K7105.

[Production Example 1] Synthesis of Dispersion Agent (1)

To a reaction vessel (volume: 1200 L) equipped with a stirrer, a condenser, and a thermometer, 61.6 parts of 17% aqueous solution of potassium hydroxide, 19.1 parts of ACRYESTER M (product name, methyl methacrylate manufactured by Mitsubishi Rayon Co., Ltd.), and 19.3 parts of deionized water were added. Subsequently, the solution within the reaction vessel was stirred at room temperature, the exothermic peak was determined, and stirring was continued again for 4 hours. After that, the reaction solution within the reaction vessel was cooled to room temperature to obtain an aqueous solution of potassium methacrylate.

Subsequently, to a reaction vessel (volume: 1050 L) equipped with a stirrer, a condenser, and a thermometer, 900 parts of deionized water, 60 parts of ACRYESTER SEM-Na (product name, sodium 2-sulfoethyl methacrylate, manufactured by Mitsubishi Rayon Co., Ltd., 42% by mass aqueous solution), 10 parts of the above aqueous solution of potassium methacrylate, and 12 parts of ACRYESTER M were added followed by stirring. The temperature was raised to 50° C. while flushing the inside of the polymerization apparatus with nitrogen. As a polymerization initiator, 0.08 part of V-50 (product name, 2,2'-azobis(2-methylpropionamidine)dihydrochloride acid salt manufactured by Wako Pure Chemical Industries, Ltd.) was added thereto and the temperature was raised again to 60° C. After raising the temperature, ACRYESTER M was continuously added dropwise for 75 minutes at a rate of 0.24 part/minute. After being maintained at 60° C. for 6 hours, the reaction solution was cooled to room temperature to obtain the dispersion agent (1) as a transparent aqueous solution with a solid content of 10% by mass.

[Production Example 2] Synthesis of Chain Transfer Agent (1)

To an apparatus for synthesis equipped with a stirrer, 2.00 g (8.03 mmol) of cobalt (II) acetate tetrahydrate (manufactured by Wako Pure Chemical Industries, Ltd., Wako Special grade), 3.86 g (16.1 mmol) of diphenyl glyoxime (manufactured by Tokyo Chemical Industry Co., Ltd., EP grade), and 100 ml of diethyl ether from which oxygen has been removed in advance by nitrogen bubbling were added and stirred for 2 hours at room temperature.

Subsequently, 20 ml of diethyl ether boron trifluoride complex (manufactured by Tokyo Chemical Industry Co., Ltd., EP grade) was added and stirred again for 6 hours. The resultant was filtered, and the solid was washed with diethyl ether and dried for 12 hours at 20° C., 100 MPa or less to obtain 5.02 g (7.93 mmol, yield 99% by mass) of the chain transfer agent (1) as a brown solid.

[Production Example 3] Synthesis of Macromonomer (a-1)

To a polymerization apparatus equipped with a stirrer, a condenser, and a thermometer, 145 parts of deionized water, 0.13 part of sodium sulfate ($Na_2SO_4$), and 0.26 part of the dispersion agent (1) (solid content of 10% by mass) which has been prepared in Production Example 1 were added followed by stirring to obtain a homogenous aqueous solution. Next, 100 parts of ACRYESTER M, 0.0009 part of the chain transfer agent (1) which has been prepared in Production Example 2, and 0.1 part of PEROCTA O (product name, 1,1,3,3-tetramethylbutylperoxy2-ethylhexanoate manufactured by NOF CORPORATION) as a polymerization initiator were added to obtain an aqueous dispersion. Subsequently, the inside of the polymerization apparatus was fully flushed with nitrogen and the temperature of the aqueous dispersion was raised to 80° C. It was then maintained for 4 hours followed by raising the temperature to 92° C. at which the dispersion was maintained for 2 hours. After that, the reaction solution was cooled to 40° C. to obtain an aqueous suspension of the macromonomer. The aqueous suspension was filtered through a filter cloth, and the filtrate was washed with deionized water and dried for 16 hours at 40° C. to obtain the reactant. It was confirmed that the introduction rate of a terminal double bond in the reactant was close to 100% and the reactant is the macromonomer (a-1). The average particle diameter of the macromonomer (a-1) was 95 μm, Mw was 32,100, and Mn was 17,000. The evaluation results are shown in Table 1.

[Production Examples 4 to 6] Synthesis of Macromonomers (a-2) to (a-4)

The macromonomers (a-2) to (a-4) were obtained in the same manner as the synthesis of macromonomer (a-1) except that the raw material monomer composition for obtaining the macromonomer (a-1) was the same as those shown in Table 1. The evaluation results are shown in Table 1.

[Production Example 7] Synthesis of Aqueous Suspension of Macromonomer (a-5)

An aqueous suspension of the macromonomer (a-5) was synthesized in the same manner as Production Example 3. Furthermore, by using a part of the aqueous suspension of the macromonomer (a-5), the macromonomer (a-5) was obtained in the same manner as Production Example 3. The evaluation results are shown in Table 1.

TABLE 1

|  |  | Type | | | | | |
|---|---|---|---|---|---|---|---|
| Macromonomer (a) |  | (a-1) | (a-4) | (a-2) | (a-3) | (a-4) | (a-5) |
| Composition of raw | MMA | 100 | 95 | 95 | 97 | 90 | 100 |
| material monomer (part) | MA | — | 5 | 5 | 3 | 10 | — |
| SP value $(J/cm^3)^{0.5}$ |  | 19.40 | 19.50 | 19.50 | 19.46 | 19.59 | 19.40 |

TABLE 1-continued

| Macromonomer (a) | Type | | | | | |
|---|---|---|---|---|---|---|
| | (a-1) | (a-4) | (a-2) | (a-3) | (a-4) | (a-5) |
| Average particle diameter (μm) | 95 | 100 | 100 | 99 | 105 | 148 |
| Mw | 32,100 | 56,000 | 56,000 | 42,000 | 106,000 | 31,300 |
| Mn | 17,000 | 26,800 | 26,800 | 19,200 | 52,000 | 16,500 |
| Introduction rate of terminal double bond (%) | About 100 | About 100 | About 100 | About 100 | About 100 | About 100 |

MMA: methyl methacrylate (product name: ACRYESTER M, manufactured by Mitsubishi Rayon Co., Ltd.)
MA: methyl acrylate (Wako Special grade, manufactured by Wako Pure Chemical Industries, Ltd.)

Example 1

By mixing 145 parts of deionized water, 0.13 part of sodium sulfate, and 0.26 part of the dispersion agent (1) which has been prepared in Production Example 1, an aqueous dispersion medium for suspension was prepared.

To a separable flask with a condensing tube, 40 parts of the macromonomer (a-1), 36 parts of nBA (n-butyl acrylate manufactured by Mitsubishi Chemical Corporation) as the raw material monomer (b), and 24 parts of ACRYESTER M as the raw material monomer (c) were added and the temperature was raised to 50° C. under stirring to obtain a raw material syrup. After cooling the raw material syrup to 40° C. or lower, 0.5 part of V60 (product name, 2,2'-azobisbutyronitrile manufactured by Wako Pure Chemical Industries, Ltd.) was dissolved in the raw material syrup to obtain a syrup.

In this case, solubility parameter (SP) of the macromonomer (a-1), SP of the homopolymer (B) obtained by polymerization of the raw material monomer (b), and SP of the homopolymer (C) obtained by polymerization of the raw material monomer (c) were described in Table 2.

Subsequently, the above aqueous dispersion medium was added to this syrup and, by performing flushing of the atmosphere inside the separable flask with nitrogen by nitrogen bubbling and increasing the revolution number for stirring, a syrup suspension was obtained.

The syrup dispersion was heated to 75° C. and the outside temperature of the separable flask was maintained till to have a polymerization exothermic peak. Once there is a polymerization exothermic peak, the syrup dispersion was heated to 85° C. when it reaches 75° C. By maintaining it for 30 minutes, the polymerization was completed and a suspension was obtained.

After cooling the suspension to 40° C. or lower, the suspension was filtered through a filter cloth, and the filtrate was washed with deionized water and dried for 16 hours at 40° C. to obtain the polymer (D-1). It was found that Mw of the polymer (D-1) was 364,900 and the average particle diameter was 475 μm. Furthermore, the composition of the polymer (D-1) was MMA/nBA=64/36 (mass ratio), and the thermal decomposition temperature was as follows: Td5 was 237° C. and Td10 was 277° C.

The polymer (D-1) was extruded at 220° C. by using a 30 mm monoaxial extruder to obtain the pellet-shaped molding material (1). By using the obtained molding material (1), injection molding was performed with an injection molding machine (product name: IS100EN, manufactured by Toshiba Machine Plastic Engineering Co., Ltd.) to obtain the molded product (1) which has width of 50 mm, length of 100 mm, and thickness of 2 mm. The molded product (1) had haze of 3.84% and YI of 2.10. The evaluation results are shown in Table 2.

TABLE 2

| | Composition of the polymer (D) or (D') | | | | | | | | | Evaluation result | | | | | |
|---|---|---|---|---|---|---|---|---|---|---|---|---|---|---|---|
| | | Macromonomer (a) | | | Raw material monomer (b) | | | Raw material monomer (c) | | | Polymer | | | | Molded product | |
| | Type | Type | SP value | Amount (part) | Type | SP value | Amount (part) | Type | SP value | Amount (part) | Mw(−) | Average particle diameter (μm) | Td5 (° C.) | Td10 (° C.) | Haze (%) | YI (−) |
| Example 1 | D-1 | a-1 | 19.40 | 40 | nBA | 19.99 | 36 | MMA | 19.40 | 24 | 364,900 | 475 | 237 | 277 | 3.8 | 2 |
| Example 2 | D-2 | a-1 | 19.40 | 20 | nBA | 19.99 | 40 | MMA | 19.40 | 40 | 427,400 | 390 | 257 | 311 | 10 | 3 |
| Example 3 | D-3 | a-1 | 19.40 | 40 | nBA | 19.99 | 12 | MMA | 19.40 | 48 | 84,100 | 700 | 238 | 274 | 3.1 | 1 |
| Example 4 | D-4 | a-1 | 19.40 | 40 | nBA | 19.99 | 18 | MMA | 19.40 | 42 | 377,000 | 760 | 227 | 265 | 4.3 | 3 |
| Example 5 | D-5 | a-1 | 19.40 | 20 | nBA | 19.99 | 8 | MMA | 19.40 | 72 | 139,900 | 735 | 240 | 280 | 1.6 | 1 |
| Example 6 | D-6 | a-2 | 19.50 | 40 | nBA | 19.99 | 30 | MMA | 19.40 | 30 | 278,000 | 720 | 278 | 310 | 2.1 | 3 |
| Example 7 | D-7 | a-2 | 19.50 | 40 | nBA | 19.99 | 20 | MMA | 19.40 | 40 | 195,000 | 780 | 276 | 305 | 2.2 | 1 |
| Example 8 | D-8 | a-2 | 19.50 | 40 | nBA | 19.99 | 12 | MMA | 19.40 | 48 | 128,000 | 700 | 281 | 306 | 1.2 | 1 |
| Example 9 | D-9 | a-3 | 19.46 | 40 | nBA | 19.99 | 36 | MMA | 19.40 | 24 | 278,000 | 735 | 260 | 300 | 2.5 | 2 |
| Example 10 | D-10 | a-3 | 19.46 | 40 | nBA | 19.99 | 24 | MMA | 19.40 | 36 | 180,000 | 690 | 274 | 302 | 1.5 | 1 |
| Example 11 | D-11 | a-4 | 19.59 | 40 | nBA | 19.99 | 36 | MMA | 19.40 | 24 | 240,000 | 800 | 290 | 320 | 2.1 | 1 |
| Example 12 | D-12 | a-5 | 19.40 | 40 | nBA | 19.99 | 36 | MMA | 19.40 | 24 | 1,573,100 | 693 | 228 | 271 | 2.7 | 5 |
| Example 13 | D-13 | a-2 | 19.50 | 40 | EHA | 18.86 | 36 | MMA | 19.40 | 24 | 106,900 | 705 | 267 | 295 | 5.7 | 9 |
| Example 14 | D-14 | a-2 | 19.50 | 40 | EHA | 18.86 | 12 | MMA | 19.40 | 48 | 1,055,400 | 690 | 276 | 293 | 1.5 | 1 |
| Comparative Example 1 | D'-1 | a-1 | 19.40 | 40 | nBA | 19.99 | 60 | — | — | — | Impossible to measure | 1,700 | 229 | 266 | 82 | 7 |
| Comparative Example 2 | — | a-1 | 19.40 | 70 | nBA | 19.99 | 15 | MMA | 19.40 | 15 | Impossible to have suspension polymerization | | | | | |

TABLE 2-continued

| | | Composition of the polymer (D) or (D') | | | | | | | | Evaluation result | | | | | |
| --- | --- | --- | --- | --- | --- | --- | --- | --- | --- | --- | --- | --- | --- | --- | --- |
| | | Macromonomer (a) | | | Raw material monomer (b) | | | Raw material monomer (c) | | | Polymer | | | Molded product | |
| | | | | | | | | | | | Average particle | | | | |
| | Type | Type | SP value | Amount (part) | Type | SP value | Amount (part) | Type | SP value | Amount (part) | Mw(—) | diameter (μm) | Td5 (° C.) | Td10 (° C.) | Haze (%) | YI (—) |
| Comparative Example 3 | D'-3 | a-1 | 19.40 | 20 | nBA | 19.99 | 72 | MMA | 19.40 | 8 | 393,600 | 2,635 | 248 | 285 | 87 | 8 |
| Comparative Example 4 | — | a-1 | 19.40 | 4 | nBA | 19.99 | 60 | MMA | 19.40 | 36 | Impossible to have suspension polymerization | | | | | |
| Comparative Example 5 | D'-5 | a-1 | 19.40 | 10 | nBA | 19.99 | 40 | MMA | 19.40 | 50 | 394,300 | 750 | 214 | 285 | 70 | 3 |
| Comparative Example 6 | — | a-1 | 19.40 | 40 | EHA | 18.86 | 60 | — | — | — | Impossible to have suspension polymerization | | | | | | nBA: n-Butyl acrylate (manufactured by Mitsubishi Chemical Corporation)
EHA: 2-Ethylhexyl acrylate (manufactured by Mitsubishi Chemical Corporation)
MMA: Methyl methacrylate (manufactured by Mitsubishi Rayon Co., Ltd., product name: ACRYESTER M)

Example 2

The polymer (D-2) was obtained in the same manner as Example 1 except that the composition of the polymer (D) was changed to the composition shown in Table 2. The results of evaluation of the polymer (D-2) are shown in Table 1.

According to molding of the polymer (D-2) as a molding material at 210° C. by using a small injection molding machine (manufactured by Custom Scientific Instruments Inc., product name: CS-183-MMX), the molded product (2) having width of 10 mm, length of 20 mm, and thickness of 2 mm was obtained. The results of evaluation of the molded product (2) are shown in Table 2.

Examples 3 to 11

The polymers (D-3) to (D-11) and the molded products (3) to (11) were obtained in the same manner as Example 2 except that the composition of the polymer (D) was changed to the composition shown in Table 2. The evaluation results are shown in Table 2.

Example 12

36 parts of nBA and 24 parts of ACRYESTER M were added to 98 parts of an aqueous suspension of the macromonomer (a-5) (40 parts in terms of the macromonomer (a-5)), and by keeping them at 50° C. for 1 hour under stirring, a raw material suspension was obtained. After that, the raw material suspension was cooled to 30° C., and 0.5 part of AIBN was added to the raw material suspension. Furthermore, an additional dispersion medium containing 220 parts of deionized water, 0.76 part of sodium sulfate, and 0.39 part of the dispersion agent (1) which has been prepared in Production Example 1 was added, and by performing flushing of the atmosphere inside the separable flask with nitrogen by nitrogen bubbling, a syrup suspension was obtained.

The syrup dispersion was heated to 75° C. and the outside temperature of the separable flask was maintained till to have a polymerization exothermic peak. Once there is a polymerization exothermic peak, the syrup dispersion was heated to 85° C. when it reaches 75° C. By maintaining it for 30 minutes followed by cooling to 40° C. or lower, a suspension was obtained. The suspension was filtered through a filter cloth, and the filtrate was washed with deionized water and dried for 16 hours at 40° C. to obtain the polymer (D-12). The molded product (12) was obtained in the same manner as Example 2 except that the polymer (D-12) was used instead of the polymer (D-2). The evaluation results are shown in Table 2.

Examples 13 to 14

The polymers (D-13) and (D-14) and the molded products (13) and (14) were obtained in the same manner as Example 2 except that the raw material monomer (b) was changed to 2-ethylhexyl acrylate (EHA). The evaluation results are shown in Table 2.

Comparative Example 1

The polymer (D'-1) and the molded product (1') were obtained in the same manner as Example 2 except that the composition of the polymer (D) was changed to the composition shown in Table 2. The evaluation results are shown in Table 2.

Because the raw material monomer (c) was not used at the time of obtaining the polymer (D'-1), the obtained molded product (1') exhibited white cloudiness.

Comparative Example 2

It was tried to obtain the polymer (D'-2) in the same manner as Example 2 except that the composition of the polymer (D) was changed to the composition shown in Table 2. However, as the content of the macromonomer (a) was too high, a syrup suspension was not obtained so that it was impossible to perform suspension polymerization.

Comparative Example 3

The polymer (D'-3) and the molded product (3') were obtained in the same manner as Example 2 except that the composition of the polymer (D) was changed to the composition shown in Table 2. The evaluation results are shown in Table 2.

Because the content of the macromonomer (b) was too high at the time of obtaining the polymer (D'-3), the obtained molded product (3') exhibited white cloudiness.

Comparative Example 4

It was tried to obtain the polymer (D'-4) in the same manner as Example 2 except that the composition of the polymer (D) was changed to the composition shown in Table 2. However, as the content of the macromonomer (a) was too low, the suspension was not evenly dispersed so that it was impossible to perform suspension polymerization.

Comparative Example 5

The polymer (D'-5) was obtained in the same manner as Example 2 except that the composition of the polymer (D) was changed to the composition shown in Table 2. The evaluation results are shown in Table 2.

Because the content of the macromonomer (a) was too low at the time of obtaining the polymer (D'-5), the obtained molded product (5') exhibited white cloudiness.

Comparative Example 6

It was tried to obtain the polymer (D'-6) in the same manner as Example 2 except that the composition of the polymer (D) was changed to the composition shown in Table 2. However, as the macromonomer (a) was not dissolved in the raw material monomer (b) so that it was impossible to perform suspension polymerization.

The invention claimed is:

1. A polymer (D) obtained by suspension polymerization of a monomer mixture (1) comprising (a) to (c) below:
   (a) 15 to 60% by mass of a macromonomer represented by General Formula (1)

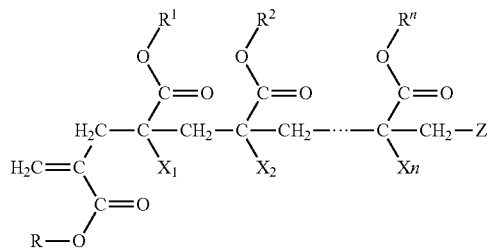

wherein:
   R and $R^1$ to $R^n$ each independently represent a hydrogen atom, an alkyl group, a cycloalkyl group, an aryl group, or a heterocyclic group,
   $X_1$ to $X_n$ each independently represent a hydrogen atom or a methyl group,
   Z represents a terminal group, and
   n is a natural number of 2 to 10,000;
   (b) 5 to 60% by mass of a raw material monomer of a homopolymer (B) that is obtained by polymerization of the raw material monomer and has a solubility parameter which is different by 0.25 or more from the solubility parameter of the macromonomer (a); and
   (c) 10 to 80% by mass of a raw material monomer of a homopolymer (C) that is obtained by polymerization of the raw material monomer and has a solubility parameter which is different by less than 0.25 from the solubility parameter of the macromonomer (a),
   wherein a weight average molecular weight of the polymer (D) is 100,000 or more.

2. The polymer (D) according to claim 1, wherein the monomer for obtaining the macromonomer (a) is methacrylic acid ester, the raw material monomer (b) is acrylic acid ester, and the raw material monomer (c) is methacrylic acid ester.

3. The polymer (D) according to claim 1, wherein the raw material monomer (b) is acrylic acid ester having an ester group with 1 to 10 carbon atoms.

4. A molding material comprising the polymer (D) according to claim 1.

5. A molded product obtained from the molding material according to claim 4.

6. A method for producing a polymer (D) by suspension polymerization of the monomer mixture (1-I) comprising the following (a-I) to (c-I):
   (a-I) 15 to 60% by mass of a macromonomer represented by General Formula (1)

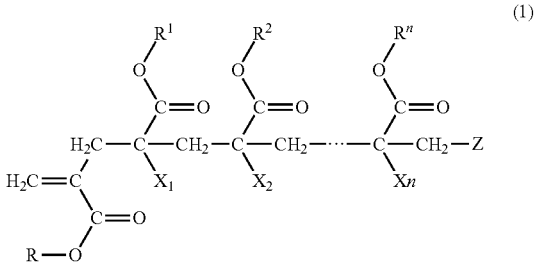

wherein:
   R and $R^1$ to $R^n$ each independently represent a hydrogen atom, an alkyl group, a cycloalkyl group, an aryl group, or a heterocyclic group,
   $X_1$ to $X_n$ each independently represent a hydrogen atom or a methyl group,
   Z represents a terminal group, and
   n is a natural number of 2 to 10,000;
   (b-I) 5 to 60% by mass of acrylic acid ester; and
   (c-I) 10 to 80% by mass of methacrylic acid ester,
   wherein the macromonomer (a-I) comprises a methyl methacrylate unit and a methyl acrylate unit, the acrylic acid ester (b-I) is butyl acrylate, and the methacrylic acid ester (c-I) is methyl methacrylate.

7. A molding material comprising the polymer (D) that is obtained by the method according to claim 6.

8. A molded product obtained from the molding material according to claim 7.

9. A method for producing a polymer (D) by suspension polymerization of a syrup dispersion in which a monomer solution having the following macromonomer (a) dissolved in a monomer mixture (2), which contains the raw material monomer (b) and the raw material monomer (c) below, is dispersed in water:

(a) 15 to 60% by mass of a macromonomer represented by General Formula (1)

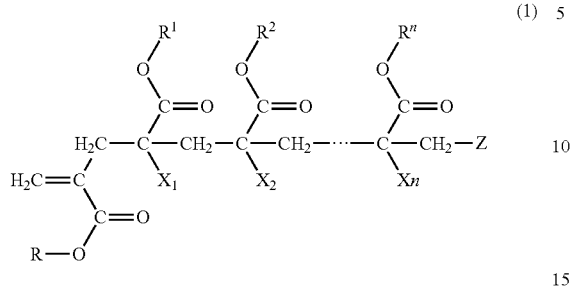

wherein:
R and $R^1$ to $R^n$ each independently represent a hydrogen atom, an alkyl group, a cycloalkyl group, an aryl group, or a heterocyclic group,
$X_1$ to $X_n$ each independently represent a hydrogen atom or a methyl group,
Z represents a terminal group, and
n is a natural number of 2 to 10,000;
(b) 5 to 60% by mass of a raw material monomer of a homopolymer (B) that is obtained by polymerization of the raw material monomer and has a solubility parameter which is different by 0.25 or more from the solubility parameter of the macromonomer (a); and
(c) 10 to 80% by mass of a raw material monomer of a homopolymer (C) that is obtained by polymerization of the raw material monomer and has a solubility parameter which is different by less than 0.25 from the solubility parameter of the macromonomer (a).

10. The method for producing a polymer (D) according to claim 9, wherein the syrup dispersion is obtained by dissolving the macromonomer (a) in the monomer mixture (2) containing the raw material monomer (b) and the raw material monomer (c), adding a radical polymerization initiator, and then adding a dispersion agent and a dispersion medium.

11. The method for producing a polymer (D) according to claim 9, wherein the syrup dispersion is obtained by adding the monomer mixture (2) containing the raw material monomer (b) and the raw material monomer (c) to an aqueous suspension containing particulate products of the macromonomer (a).

12. A molding material comprising the polymer (D) that is obtained by the method according to claim 9.

13. A molded product obtained from the molding material according to claim 12.

14. A polymer (D) obtained by suspension polymerization of a monomer mixture (1) comprising (a) to (c) below:
(a) 15 to 60% by mass of a macromonomer represented by General Formula (1) below;

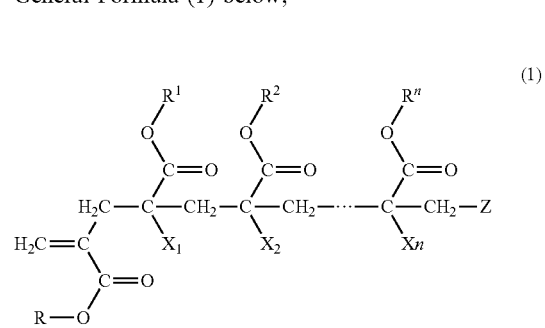

wherein:
R and $R^1$ to $R^n$ each independently represent a hydrogen atom, an alkyl group, a cycloalkyl group, an aryl group, or a heterocyclic group,
$X_1$ to $X_n$ each independently represent a hydrogen atom or a methyl group,
Z represents a terminal group, and
n is a natural number of 2 to 10,000;
(b) 5 to 60% by mass of a raw material monomer of a homopolymer (B) that is obtained by polymerization of the raw material monomer and has a solubility parameter which is different by 0.25 or more from the solubility parameter of the macromonomer (a), and
(c) 10 to 80% by mass of a raw material monomer of a homopolymer (C) that is obtained by polymerization of the raw material monomer and has a solubility parameter which is different by less than 0.25 from the solubility parameter of the macromonomer (a),
wherein the monomer for obtaining the macromonomer (a) is a monomer composition containing methacrylic acid ester and acrylic acid ester, the raw material monomer (b) is acrylic acid ester, and the raw material monomer (c) is methacrylic acid ester.

15. A molding material comprising the polymer (D) according to claim 14.

16. The polymer (D) according to claim 14, wherein the monomer for obtaining the macromonomer (a) is a monomer composition containing methyl methacrylate and methyl acrylate, the raw material monomer (b) is butyl acrylate, and the raw material monomer (c) is methyl methacrylate.

* * * * *